3,028,388
DERIVATIVES OF PIPERAZINE
Robert L. Clarke, Bethlehem, N.Y., assignor to Sterling Drug Inc., New York, N.Y., a corporation of Delaware
No Drawing. Filed Jan. 27, 1960, Ser. No. 4,880
6 Claims. (Cl. 260—268)

This invention relates to bis-amide compounds, and in particular is concerned with 2,3-dicarbo-lower-alkoxy-piperazines having dihaloacetyl radicals in the 1- and 4- positions, intermediates therefor, and the preparation thereof.

In the 1,4-bis(dihaloacetyl)-2,3-dicarbo-lower-alkoxy-piperazines of the invention the lower-alkoxy radicals are derived from hydrocarbon alcohols having from one to about four carbon atoms. They are represented by the following structural formula

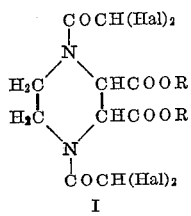

I wherein R represents a lower-alkyl radical having from one to about four carbon atoms and Hal represents a halogen atom. In the above general Formula I the R's are preferably identical and include straight or branched chain hydrocarbon radicals. Thus, included in the definition of R are, for example, methyl, ethyl, propyl, isopropyl, butyl, sec.-butyl and t-butyl.

In the above general Formula I the Hal's are preferably identical and represent any of the four halogens, fluorine, chlorine, bromine or iodine.

The preparation of the compounds of Formula I is carried out by heating the appropriate di-lower-alkyl 2,3-piperazinedicarboxylate or an acid-addition salt thereof with an excess of dihaloacetyl halide. The reaction takes place at temperatures between about 50° C. and 150° C. although it is preferred to carry out the reaction at about 100°. If desired the reaction can be carried out in a solvent inert to the reaction conditions. The solvents that can be used include chlorinated hydrocarbons such as chloroform, carbon tetrachloride and methylene dichloride, aromatic hydrocarbons such as benzene, toluene, xylene, etc., ethers such as diethyl ether, dibutyl ether, tetrahydrofuran, etc. and ketones such as acetone, methyl ethyl ketone, etc. The solvent, if used, and excess dihalo-acylating agent are removed by distillation or evaporation and the desired products obtained by crystallization.

The intermediate di-lower-alkyl 2,3-piperazine-dicarboxylates are a new class of compounds. They are prepared by reduction of the corresponding pyrazine esters over Raney nickel. The reduction is carried out in an inert solvent as, for example, a lower-alkanol and the products obtained by crystallization. The use of Raney nickel as hydrogenation catalyst provides the novel piperazines in good yield but replacement of the pyrazine esters with the corresponding acids or anhydrides under the same conditions does not give an identifiable product.

The compounds of Formula I have been found to possess bactericidal activity against such organisms as *Staphylococcus aureus, Eberthella typhi, Pseudomonas aeruginosa, Clostridium welchii*, and the like.

The compounds are prepared for use as antibacterial agents by preparing a solution in aqueous acid or a neutral solution which may contain a surfactant, and are applied to a surface to be disinfected by conventional means such as spraying, swabbling, immersion, and the like.

The structures of the 1,4-bis(dihaloacetyl)-2,3-dicarbo-lower-alkoxypiperazines and intermediate di-lower-alkyl 2,3-piperazinedicarboxylates are established by their mode of synthesis and corroborated by the correspondence of calculated and found values for the elementary analyses for representative examples.

The following examples will further illustrate the invention without limiting the same thereto.

EXAMPLE 1

*Dimethyl 2,3-Piperazinedicarboxylate Dihydrochloride*

A solution of 17.8 g. of dimethyl 2,3-pyrazinedicarboxylate in 140 ml. of absolute ethanol was hydrogenated over Raney nickel up to 55° C. for two and one-half hours. The catalyst was removed by filtration and the solvent removed by evaporation under diminished pressure to give the free base, dimethyl 2,3-piperazinedicarboxylate. The residue containing the free base was taken up in 25 ml. of absolute ethanol and 36.4 ml. of 5 N alcoholic hydrogen chloride added. The solid which separated was collected by filtration then boiled with 300 ml. of 95% ethanol. The solution was filtered hot and the filtrate left overnight in the refrigerator. There was thus obtained 8.2 g. of dimethyl 2,3-piperazinedicarboxylate dihydrochloride, M.P. 189° C. (dec.) (corr.).

*Analysis.*—Calcd. for $C_8H_{16}Cl_2N_2O_4$: C. 34.93; Cl, 25.78. Found: C, 35.09; Cl, 25.56.

*1,4-Bis(dichloroacetyl)-2,3-Dicarbomethoxypiperazine*

A mixture of 20 g. of dimethyl 2,3-piperazinedicarboxylate dihydrochloride and 57 ml. of dichloroacetyl chloride was heated at 100° C. for one and one-half hours. The excess acid chloride was removed by evaporation under diminished pressure and the residue boiled with 100 ml. of acetone. The acetone was removed by distillation and the residue taken up in 125 ml. of chloroform and boiled. Refrigeration of the chloroform solution caused the separation of a white solid which was collected by filtration. After recrystallization from chloroform there was obtained 10.3 g. of 1,4-bis(dichloroacetyl)-2,3-dicarbomethoxypiperazine, M.P. 190–193° C. (corr.).

*Analysis.*—Calcd. for $C_{12}H_{14}Cl_4N_2O_6$: Cl, 33.44; N, 6.61. Found: Cl, 33.67; N, 6.59.

1,4 - bis(dichloroacetyl) - 2,3-dicarbomethoxypiperazine when tested according to standard in vitro baceteriological evaluation procedures was found to possess antibacterial activity as follows:

| Organism | Log. Reciprocal Minimum Effective Concentration (mg./cc.) | |
|---|---|---|
| | Bacteriostatic | Bactericidal |
| *Staphylococcus aureus* | 3.12 | 3.0 |
| *Eberthella typhi* | 3.3 | 3.0 |
| *Clostridium welchii* | 3.3 | 3.0 |
| *Mycobacterium tuberculosis* | 3.3 | 3.3 |
| *Pseudomonas aeruginosa* | 3.0 | 3.0 |

EXAMPLE 2

*1,4- bis(diiodoacetyl)2,3-dicarboethoxypiperazine* can be prepared by heating diethyl 2,3-piperazinedicarboxylate with excess diiodoacetyl chloride using the procedure described in Example 1.

EXAMPLE 3

*1,4 - bis(difluoroacetyl)-2,3-dicarbopropoxypiperazine* can be prepared by heating dipropyl 2,3-piperazinedicarboxylate with difluoroacetyl bromide using the procedure described in Example 1.

EXAMPLE 4

*1,4-bis(dibromoacetyl)2,3-dicarbobutoxypiperazine* can be prepared by heating dibutyl 2,3-piperazinedicarboxylate with dibromoacetyl bromide using the procedure described in Example E.

I claim:
1. A compound having the structural formula

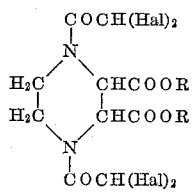

wherein R is lower-alkyl having one to four carbon atoms and Hal is a member selected from the group consisting of fluorine, chlorine, bromine and iodine.

2. 1,4 - bis(dichloroacetyl)2,3 - dicarbomethoxypiperazine.

3. Dimethyl 2,3-piperazinedicarboxylate.

4. The process for preparing a compound having the structural formula

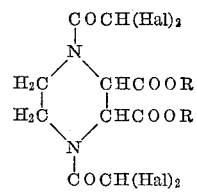

wherein R is lower-alkyl having one to four carbon atoms and Hal is a member selected from the group consisting of fluorine, chlorine, bromine and iodine which comprises heating a di-lower-alkyl 2,3-piperazinedicarboxylate with a compound having the formula

5. The process for preparing 1,4-bis(dichloracetyl)-2,3-dicarbomethoxypiperazine which comprises heating dimethoxy 2,3-piperazinedicarboxylate with dichloroacetyl chloride.

6. The process for preparing a di-lower-alkyl 2,3-piperazinedicarboxylate which comprises hydrogenating a di-lower-alkyl 2,3-pyrazinedicarboxylate over a Raney nickel catalyst.

References Cited in the file of this patent
UNITED STATES PATENTS
2,743,589     Scigliano et al.     July 15, 1958
OTHER REFERENCES
Gabriel et al.: Berichte, vol. 40, pages 4850–60 (1907).